(12) United States Patent
Vadder et al.

(10) Patent No.: US 11,052,614 B2
(45) Date of Patent: Jul. 6, 2021

(54) THERMAL FILL BONDING METHOD

(71) Applicant: Evapco, Inc., Taneytown, MD (US)

(72) Inventors: Davey Vadder, Manchester, MD (US); Jeff Kane, Biglerville, PA (US)

(73) Assignee: Evapco, Inc., Taneytown, MD (US)

( * ) Notice: Subject to any disclaimer, the term of this patent is extended or adjusted under 35 U.S.C. 154(b) by 0 days.

(21) Appl. No.: 16/835,447

(22) Filed: Mar. 31, 2020

(65) Prior Publication Data

US 2020/0290294 A1 Sep. 17, 2020

Related U.S. Application Data

(62) Division of application No. 14/830,301, filed on Aug. 19, 2015, now Pat. No. 10,603,846.

(60) Provisional application No. 62/039,110, filed on Aug. 19, 2014.

(51) Int. Cl.

| B32B 3/00 | (2006.01) |
|---|---|
| B32B 7/00 | (2019.01) |
| B32B 27/00 | (2006.01) |
| B29C 65/00 | (2006.01) |
| B32B 27/06 | (2006.01) |
| B32B 3/28 | (2006.01) |
| B32B 27/30 | (2006.01) |
| B32B 7/05 | (2019.01) |
| B29C 65/18 | (2006.01) |
| B29K 105/00 | (2006.01) |

(52) U.S. Cl.
CPC .............. *B29C 66/87* (2013.01); *B29C 65/18* (2013.01); *B29C 66/43* (2013.01); *B29C 66/81422* (2013.01); *B32B 3/28* (2013.01); *B32B 7/05* (2019.01); *B32B 27/06* (2013.01); *B32B 27/304* (2013.01); *B29K 2105/256* (2013.01)

(58) Field of Classification Search
CPC ......... B29C 66/00; B29C 66/80; B29C 66/87; B29C 65/00; B29C 65/10; B29C 65/18; B29C 66/40; B29C 66/43; B29C 66/81; B29C 66/81; B29C 66/814; B29C 66/8142; B29C 66/8142; B29C 66/81422; B32B 3/00; B32B 3/20; B32B 3/28; B32B 7/00; B32B 7/04; B32B 7/04; B32B 7/045; B32B 27/00; B32B 27/06; B32B 27/30; B32B 27/30; B32B 27/304
See application file for complete search history.

(56) References Cited

U.S. PATENT DOCUMENTS 3,402,088 A * 9/1968 Young ................. B29C 65/18
156/268
2001/0052388 A1* 12/2001 Claude ................. B29C 66/131
156/292

* cited by examiner

*Primary Examiner* — Jacob T Minskey
*Assistant Examiner* — Matthew Hoover
(74) *Attorney, Agent, or Firm* — Whiteford, Taylor & Preston, LLP; Peter J. Davis

(57) ABSTRACT

A Thermal Bonding Method and Apparatus to thermally bond sheets of fill in a cooling tower fill pack. The apparatus creates a hemispherical joint extending through two fill sheets to provide a substantial joint between said sheets.

3 Claims, 9 Drawing Sheets

Major Components

Figure 1 – Major Components
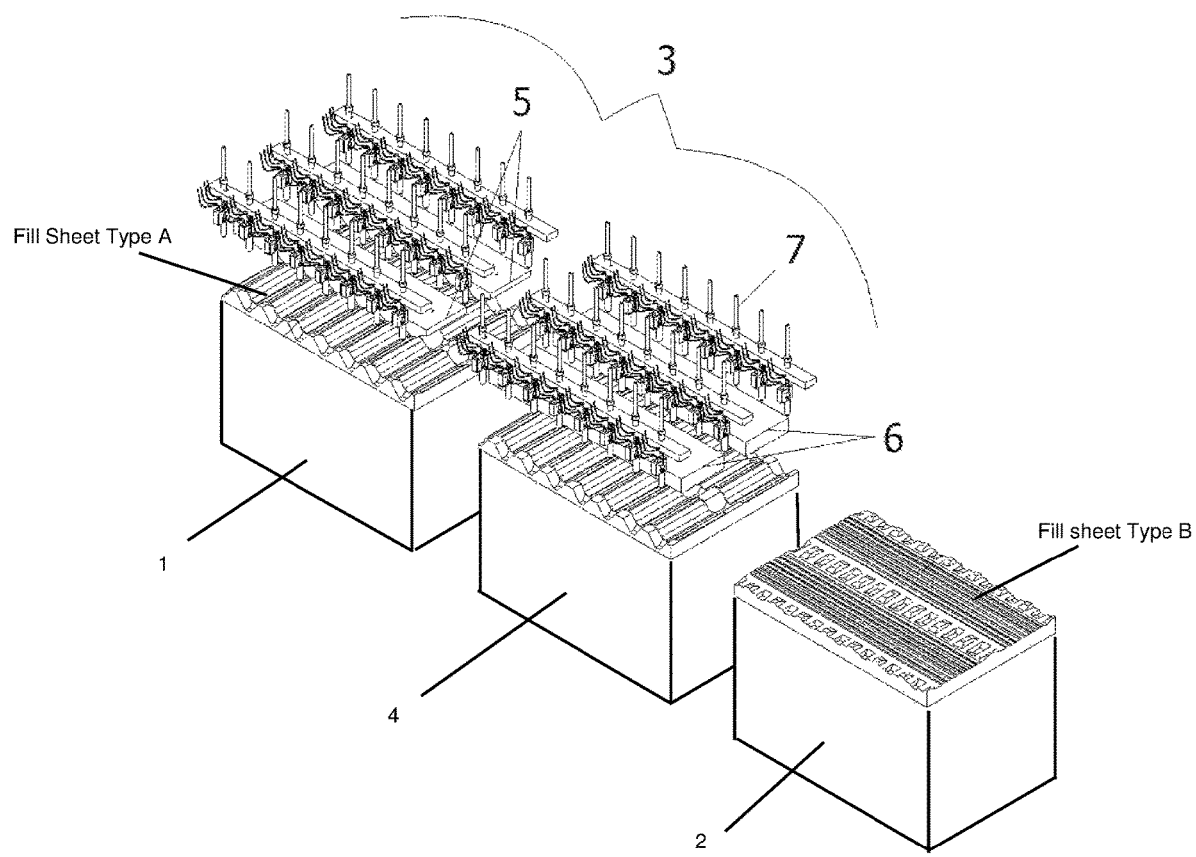

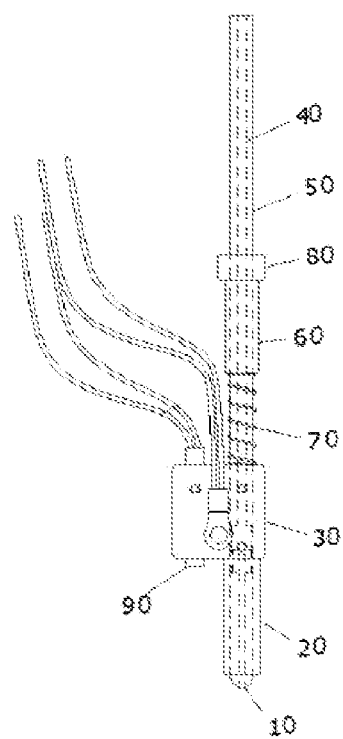
Figure 2 – Bonding Tip (Cross Section)

Figure 3 – Bonding Tip (Perspective)
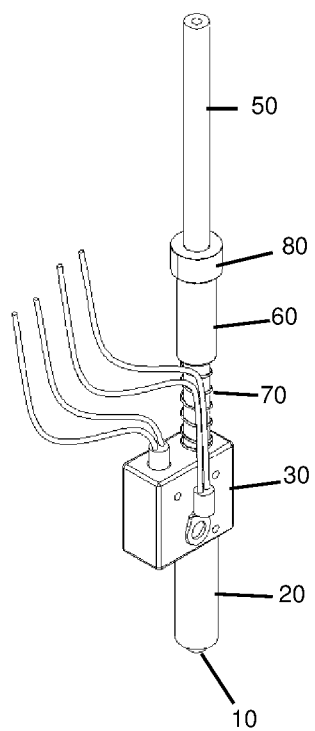

Figure 4a – Position 1
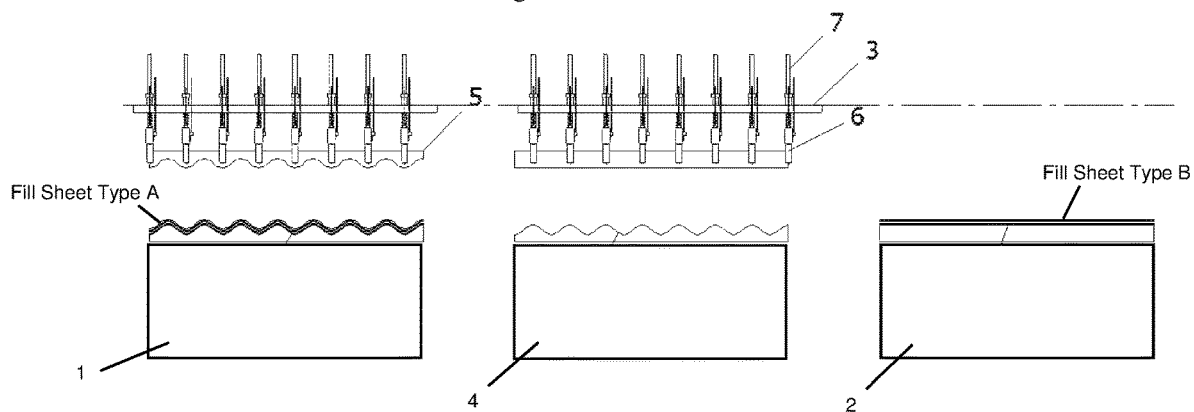
Figure 4b – Position 2
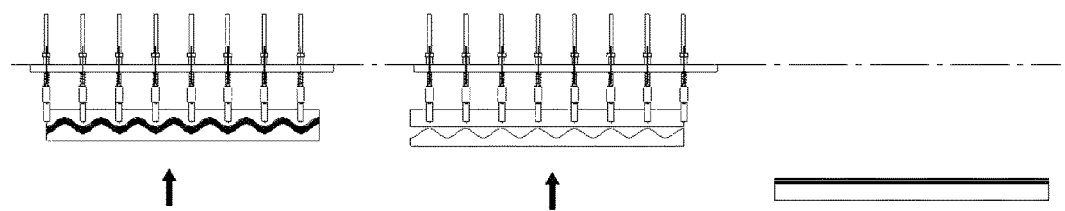
Figure 4c – Position 3
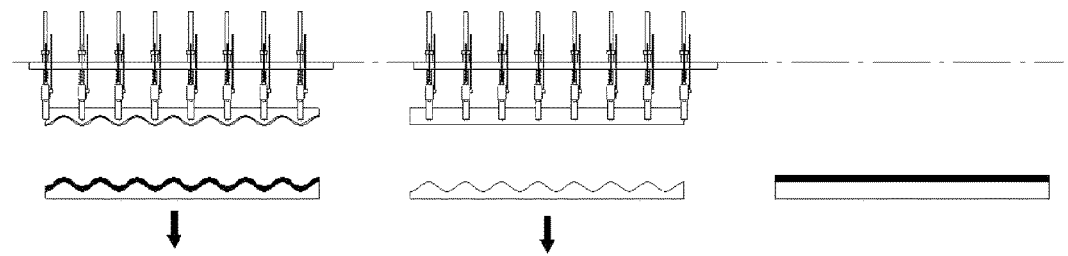

Figure 4d – Position 4
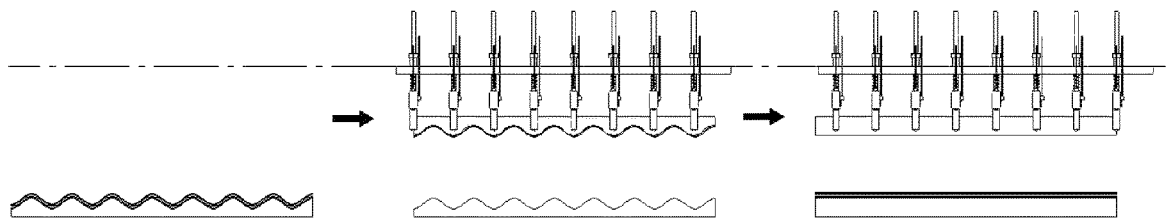
Figure 4e – Position 5
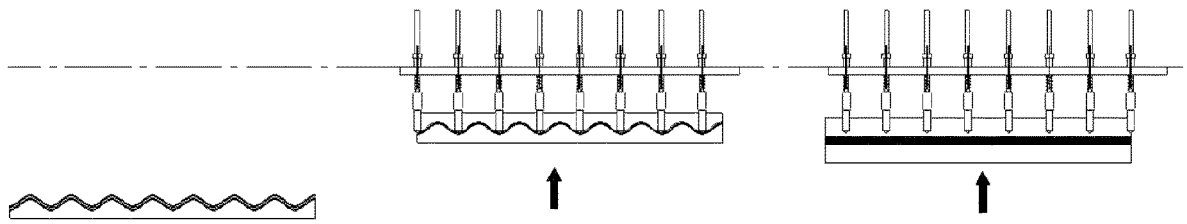
Figure 4f – Position 6
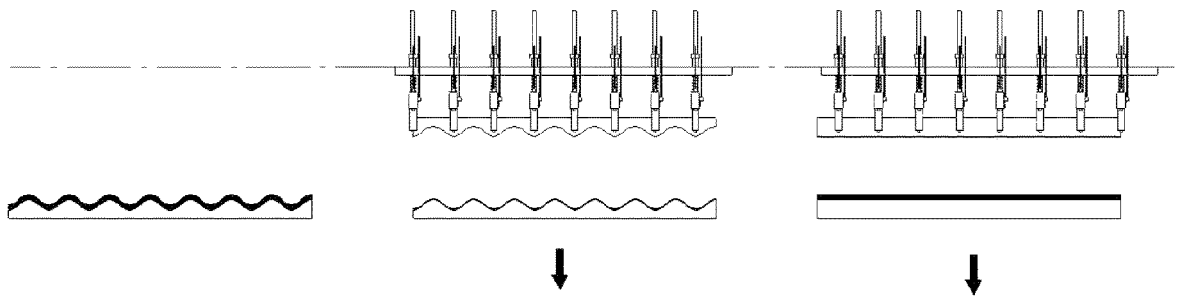

Figure 4g – Position 7
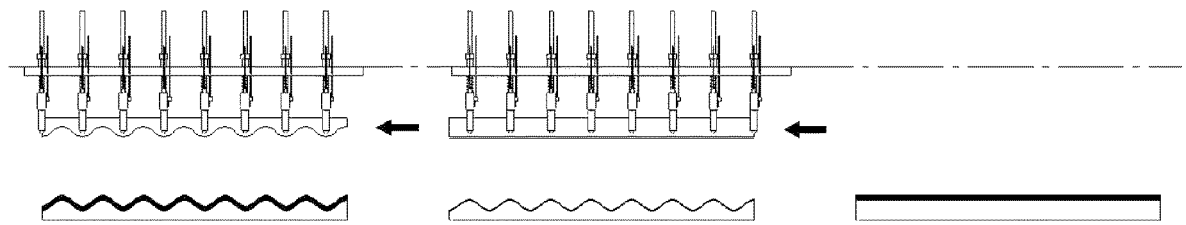
Figure 4h – Position 8
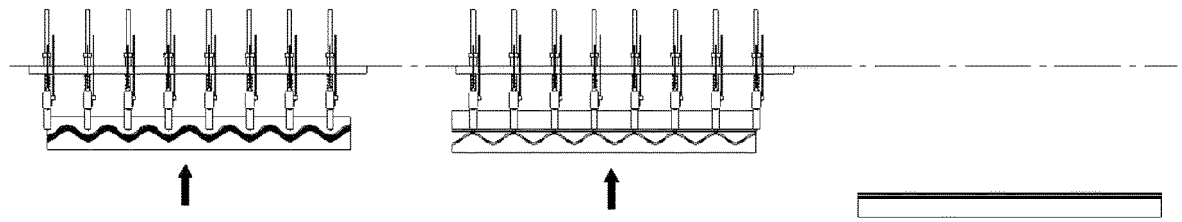
Figure 4i – Position 9 (Same as position 1)
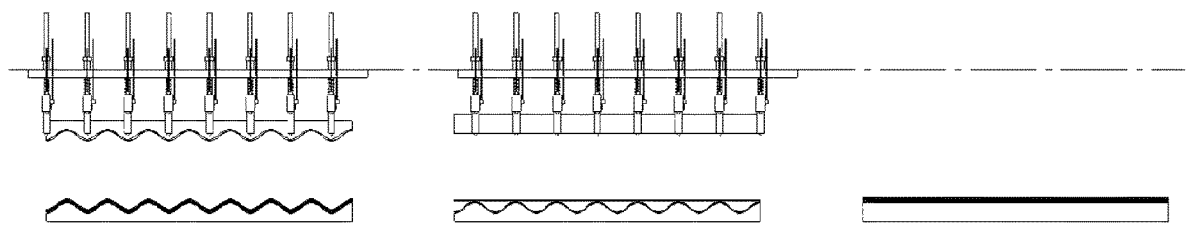

THERMAL FILL BONDING METHOD

FIELD OF THE INVENTION

This invention relates to methods and apparatuses for bonding fill sheets.

BACKGROUND OF THE INVENTION

It is well known that film-type cooling tower fill packs are stronger and easier to install when the sheets are bonded together well. Some fill sheet bonding techniques include chemical welding, snap buttons, rods, screws, nails, and thermal bonding. Chemical welding is the most common and is also usually the strongest, but requires the use of solvents and a flash time for the bond to set. Chemical welding is usually performed at a different location from the installation due to restrictions on solvents and the extreme amount of time necessary to allow the pack to cure. Snap buttons can be used at the installation site, but the joints are easily detached. Rods, screws, and nails require additional parts to be added to the pack, which increases cost. These joints are also not as substantial as chemical welding. Thermal bonding has, until this invention, been difficult to achieve a satisfactory bond. Existing methods also have difficulty reaching the interior bond sites in the pack, leading to a weak pack. This invention overcomes the current limitations for on-site bonding as well as producing a factory bond that eliminates the need for solvents.

SUMMARY OF THE INVENTION

The method presented herein distinguishes itself from other methods by allowing multiple sheets to be stack-bonded without any backing behind the sheet. This is accomplished through the implementation of an insulating bushing that holds the sheets down while the bond site is melted, plus an air pulse that forces the sheets together when the tip is retracted. Existing processes can only completely bond two sheets at a time. These two sheet assemblies are then attached to each other only by the edges. Our invention provides a full field of bonding sites to every sheet in the stack.

According to an embodiment of the invention, a thermal bonding device is used thermally weld fill sheets together. A special bonding tip design provides a method and apparatus to create a hemispherical bond that unites two fill sheets together without the need of a backing die, allowing the fill pack to be created in any thickness while reaching each and every bond site within the pack.

Accordingly, there is provided according to the invention, a thermal bonding method having the steps:
a. placing alternating film fill sheets on a stack;
b. heating a hemispherical bonding tip to the melting point of the fill sheet;
c. plunging the bonding tip vertically onto a bond site on the fill sheet until the spring is compressed;
d. waiting a specified amount of time for the tip to melt into the fill sheet down to the insulating bushing;
e. the insulating bushing providing a positive stop to position the bond tip;
f. providing a pulse of air through the bonding tip that pushes the melted sheets together; and
g. removing the bonding tip from the joint so the bond can cool.

Different fill sheet thicknesses, environmental temperature, and plastic change the melting time. According to a preferred embodiment, a melt time of 5-10 seconds may be used on 10 mil PVC at 65°-85° F. air temperature.

The method may be carried out with specific durations for each step, and some steps can occur simultaneously. According to one embodiment, the steps of placing, heating, and plunging all happen at the same time. Additionally, the air pulsing step may happen at the same time as removal. The method may be carried out with specific pressure and duration of air through the tip that may "bubble-out" the bond site. The pressure and duration of air depends on the material thickness, type of plastic, and ambient temperature. According to one embodiment, 60 psi may be applied to the air manifolds and the pressure at the bond site varies from 1-20 psi for about 1 second.

According to another embodiment of the invention, there may be provided a thermal bonding device having:
a. a hemispherical bonding tip extending through an insulating bushing;
b. a heater block to provide the temperature necessary to heat the bonding tip to a level near the melting point of the fill sheet;
c. a spring mechanism attached to the bonding tip to provide a resistance force;
d. a sliding mechanism allowing the bonding tip to move vertically; and
e. an air conduit to provide a pulse of air to the bond zone.

According to further embodiments, the device may have a ship's hull shaped tip. According to further embodiments, the device may be provided with a weight to provide resistance to the bond tip. And according to further embodiments, the device may be provided with different insulating bushing shapes. According to one embodiment, the bushing may be ⅜" outside diameter with a ¼" inside diameter. The bushing may be changed from the illustrated "pipe" shape to an elliptical shape to provide more insulator surface area in odd shaped fill geometries.

The invention may be used with all plastic fill materials and with both counterflow and crossflow fill designs.

DESCRIPTION OF THE DRAWINGS

The subsequent description of the preferred embodiments of the present invention refers to the attached drawings, wherein:

FIG. 1 is a schematic showing the major components of a fill bonding apparatus according to an embodiment of the invention.

FIG. 2 shows a cross-sectional view of the thermal bonding tip according to an embodiment of the invention.

FIG. 3 shows an outside perspective view of the thermal bonding tip according to an embodiment of the invention.

FIGS. 4a through 4i show the sequence of operation for placing fill sheets and creating the bond according to an embodiment of the invention.

DETAILED DESCRIPTION OF THE INVENTION

Figure 5A:
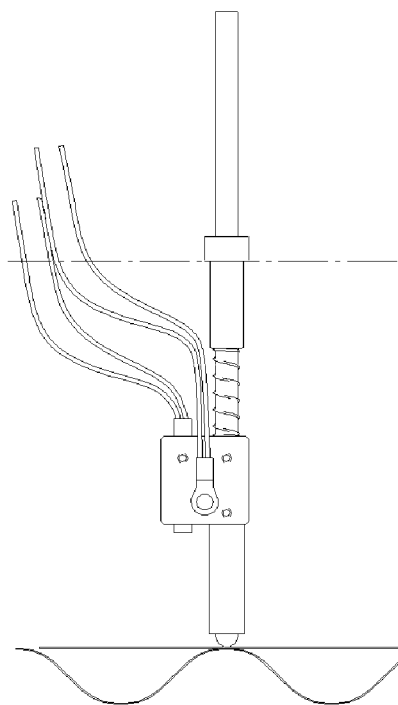
FIGS. 5a through 5e show the sequence of operation for the bonding tip according to an embodiment of the invention.

FIG. 1 shows the major components of the fill bonding apparatus. Two different sheet types, Type A and Type B, are loaded onto feeder trays 1 and 2, respectively. Gantry 3 moves horizontally to pick and place sheets type A and B, alternately, on the fill stack 4. Vacuum chucks 5 and 6 remove the sheets from the stacks 1 and 2. Arrays of thermal bonding tips 7 weld the sheets together when they are placed on the fill stack 4.

FIG. 2 illustrates the main parts of the thermal bonding device. Hemispherical tip 10 extends through insulator and holding bushing 20. Heater block 30 provides heat to the tip 10. Air passage 40 extends through heater block 30 and rod 50 to provide a conduit for pressurized air to the tip 10. Rod 50 extends vertically through slide bushing 60 to allow vertical movement of the heater block, tip, and rod. Spring 70 provides vertical force resistance to movement of tip 10. Collar 80 is fixed to tip 10 and provides a positive vertical stop to the motion of the tip. Heat sensing device 90 provides feedback to control the temperature of the tip 10.

FIG. 3 illustrates an isometric view of the thermal bonding apparatus.

FIG. 4a is an elevation view of the fill bonding apparatus illustrating the starting position in the sequence of operation with parts labeled as in FIG. 1.

FIG. 4b illustrates simultaneously raising the stacking tray 4 and the sheet type A feeder tray 1. Sheet type A is loaded into the gantry 3 and held in place by the vacuum chuck 5.

FIG. 4c illustrates simultaneously lowering the sheet type A feeder tray 1 and stacking tray 4 while sheet type A is in the loaded position.

FIG. 4d illustrates moving the gantry 3 to the sheet type B loading position and sheet type A stack placing position.

FIG. 4e illustrates simultaneously raising the stacking tray 4 and sheet type B feeder tray 2. Sheet type B is loaded into the gantry 3 and held in place by the vacuum chuck 5. Sheet type A is released by the vacuum chuck and placed on the stacking tray 4.

FIG. 4f illustrates simultaneously lowering the sheet type B feeder tray 2 and stacking tray 4 while sheet type B is in the loaded position.

FIG. 4g illustrates moving the gantry 3 to the sheet type A bonding position and sheet type B stack placing position FIG. 4h illustrates simultaneously raising the stacking tray 4 and sheet type A feeder tray 1. Sheet type A is loaded into the gantry 3 and held in place by the vacuum chuck 5. Sheet type A and sheet type B are bonded together on the stacking tray 4. This is the same position shown in FIG. 4b except bonding is being performed.

FIG. 4i illustrates returning the sheet type A feeder and stacking tray to the start position as illustrated in FIG. 4c which shows the gantry 3 loaded with sheet type A.

FIG. 5a illustrates the bonding tip just contacting the fill stack as the fill stack moves up. The bond tip heated. This occurs in position 8 of the machine.

Figure 5B:
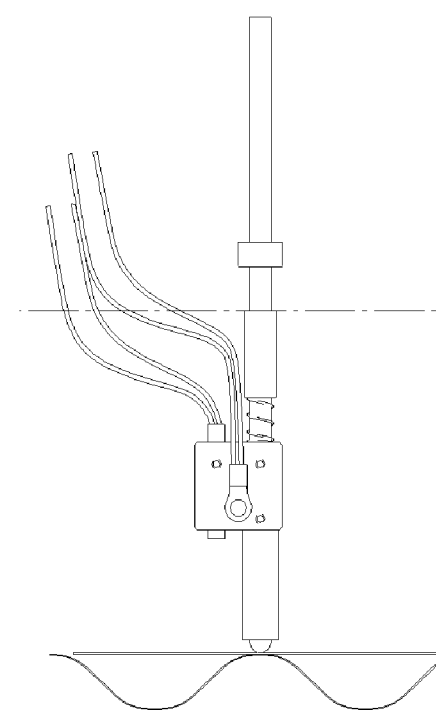

FIG. 5b illustrates the bonding tip being pushed up as the fill stack continues to move up. This compresses the spring and puts downward pressure on the bonding tip.

Figure 5C:
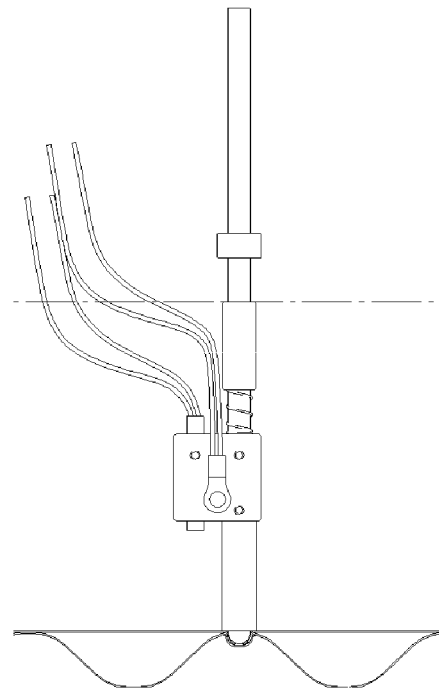

FIG. 5c illustrates the heated bonding tip extending down into the fill stack bond point as the sheets are heated. The spring decompresses partially during this step as the tip "melts" down into the bond site, still keeping pressure on the bond. The holding bushing 20 prevents the bonding tip from pushing too far into the fill stack.

Figure 5D:
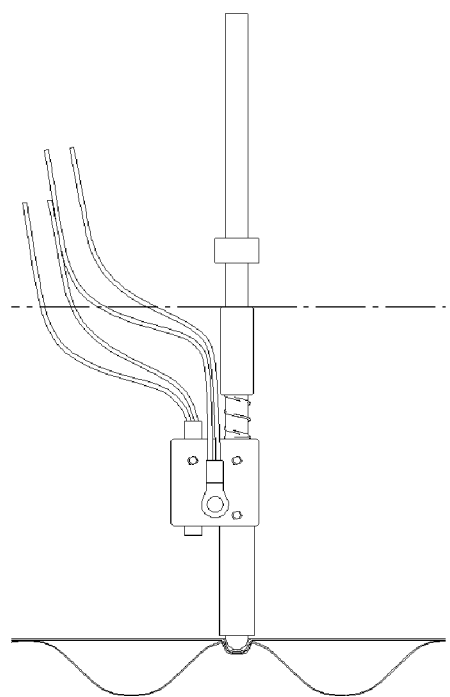

FIG. 5d illustrates the end of the bond heating cycle. At this point, the bond is melted together. As the fill stack is lowered, a burst of air is injected through the tip which pushes the sheets together and improves the bond strength. This air burst also helps eject the tip from the bond site without sticking. A "bubbled-out" joint can also be provided to enhance the bond, in which the melted bond site is blown into a partial bubble shape as air is injected. The bubble is a larger on the bottom of the joint, which keeps it from pulling out. Some instantaneous cooling may also occur, solidifying the joint.

Figure 5E:
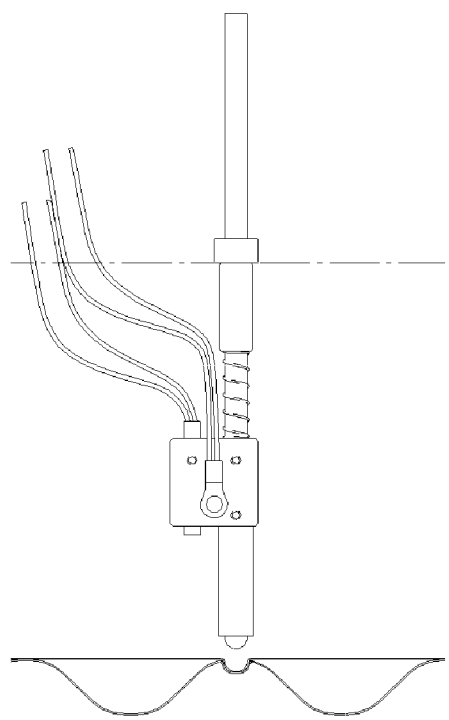

FIG. 5e is the last step and corresponds to position 1 of the machine cycle. The tip has been completely removed from the bond site, and the site is allowed to cool.

The invention claimed is:
1. A thermal bonding device comprising:
   a hemispherical bonding tip extending through an insulating bushing;
   a heater block to provide a temperature sufficient to heat the bonding tip to a melting point of a film fill sheet;
   a spring mechanism attached to the bonding tip to provide a resistance force;
   a sliding mechanism allowing the bonding tip to move vertically; and
   an air conduit having an outlet on a contact surface of said bonding tip to provide a pulse of air to a bond zone of the film fill sheet.
2. The device of claim 1 further comprising a weight to provide resistance to the bonding tip.
3. The device of claim 1 comprising a non-cylindrical insulating bushing shape.

* * * * *